United States Patent
Wink et al.

(10) Patent No.: US 7,552,520 B2
(45) Date of Patent: *Jun. 30, 2009

(54) EXTRUDED SEAL HAVING A CORRUGATED AXIAL SURFACE, A METHOD OF MANUFACTURING SUCH SEALS, AND A METHOD OF USING SUCH SEALS

(75) Inventors: Edi J. Wink, Shelby Township, MI (US); Francis V. Rolland, Rochester Hills, MI (US); John Mobley, Lexington, TN (US); Eric Frey, Lexington, TN (US); Kenneth Scott Jackson, Lexington, TN (US); Jeremy Duke, Henderson County, TN (US)

(73) Assignee: Dayco Products, LLC, Miamisburg, OH (US)

( * ) Notice: Subject to any disclaimer, the term of this patent is extended or adjusted under 35 U.S.C. 154(b) by 722 days.

This patent is subject to a terminal disclaimer.

(21) Appl. No.: 11/150,165

(22) Filed: Jun. 13, 2005

(65) Prior Publication Data

US 2006/0277744 A1     Dec. 14, 2006

(51) Int. Cl.
*B21B 1/46* (2006.01)
*B22D 11/126* (2006.01)

(52) U.S. Cl. .................. 29/527.1; 428/36.91; 428/34.1; 428/35.2; 428/35.4; 428/35.7; 428/36.6; 428/36.7; 428/36.8; 428/36.9; 277/591

(58) Field of Classification Search ................ 29/527.1; 277/591; 138/121; 428/34.1, 35.2, 35.4, 428/35.7, 36.6, 36.7, 36.8, 36.9, 36.91
See application file for complete search history.

(56) References Cited

U.S. PATENT DOCUMENTS

| 4,147,824 | A | 4/1979 | Dettmann et al. |
| 4,720,113 | A | 1/1988 | Hertz, Jr. |
| 5,459,202 | A | 10/1995 | Martinez et al. |
| 6,243,990 | B1 | 6/2001 | Cornils et al. |
| 6,270,082 | B1 | 8/2001 | Hegemier |
| 6,321,794 | B1 * | 11/2001 | Ishida et al. ............. 138/121 |
| 6,365,250 | B2 | 4/2002 | Shifman et al. |
| 6,686,012 | B1 | 2/2004 | Molnar et al. |

OTHER PUBLICATIONS http://www.parker.com; "Multi-Layered Seals"; Tri-Laminate Seals, from EAD/displayCatalog located on website.
http://www.parker.com; "Multi-Layered Seals"; Bi-Laminate Seals, from EAD/displayCatalog located on website.

* cited by examiner

*Primary Examiner*—Rick K Chang
(74) *Attorney, Agent, or Firm*—Joseph V. Tassone; Robert W. Becker & Associates

(57) ABSTRACT

An extruded seal member having a corrugated axial surface exhibiting alternating peaks and valleys extending longitudinally along the axial surface of the seal member; a method for manufacturing the seal member which comprises extruding a tubular structure having a corrugated axial surface, crosslinking the extrude tubular structure, cutting the tubular structure to provide a plurality of uniform seal members and recovering the seal members; and a method of using such multilayer seal members, are described.

22 Claims, 4 Drawing Sheets

EXTRUDED SEAL HAVING A CORRUGATED AXIAL SURFACE, A METHOD OF MANUFACTURING SUCH SEALS, AND A METHOD OF USING SUCH SEALS

BACKGROUND OF THE INVENTION

The present invention relates generally to seals, and more particularly to multilayer, extruded seals having improved physical characteristics and reduced permeability to fuel vapors, and to a method for the manufacture of such seals as well as to the use of such seals in automotive fuel system components such as an air intake manifold.

In recent years there have been numerous restrictions and regulations imposed upon manufacturing industries in general and particularly upon automotive manufacturers, which are intended to reduce the amount of potentially harmful contaminates from being released into the environment by such industries. In the automotive industry, such regulations and restrictions severely limit the amount of hydrocarbon fuel vapor and other chemical materials that can permeate from of motor vehicles. Typically, the various seals employed in the automotive industry are used in grooves for maintaining the seal member in place. Typically, the seal members are molded and are composed of fluoroelastomer rubber materials. However, these molded fluoroelastomer seal members are expensive to manufacture due, in part, to the slow production cycling time and, in part, to the expensive tooling required for the manufacture of such molded seal members. For example, molded seal members typically have retention features located on both the inside and outside of the part for retaining the seal member in a seal groove. This works well, but creates more exacting tolerances in the width of the seal member as well as the height of the seal. Since it is the height of the seal, rather than the width, that is responsible for the sealing function, exact width tolerances are not critical in most sealing functions. Furthermore, such molded seals are prone to excess parting line flash which can lead to a separate operation to remove the parting flash from each individual seal. In some instances the parting flash may be severe enough to lead to total rejection of the seal members.

Accordingly, there is a need in the automotive industry for an improved fuel system seal which meets industry standards and a method for manufacturing automotive seals which overcomes the high costs and manufacturing problems associated with the manufacture of prior seal members.

SUMMARY OF THE INVENTION

In accordance with the invention, a rigid seal member having the desired characteristics which meet the present industry permeation standards and which is relatively inexpensive to manufacture is provided by extruding a tubular structure wherein the tubular structure has a corrugated axial surface exhibiting a plurality of alternating peaks and valleys longitudinally around the axial surface of the tubular structure; crosslinking the tubular structure; and cutting the tubular structure to obtain a seal member having an irregular profile configuration which exhibits alternating peaks and valleys in an axial direction circumferentially around the inner and outer surfaces of the seal member.

The materials employed in the manufacture of the seal member in accordance with the invention, is one of those materials that will provide the desired performance characteristics to the seal member. Generally, the seal member will comprise a fluoroelastomer. Typically, the seal member of the present invention will comprise a single layer of fluoroelastomer; however, other layer may be employed. For example, the seal member may comprise a first layer of an fluoroelastomer and a second elastomeric layer which is typically a non-fluoroelastomer disposed on the outer surface of the first fluoroelastomer layer.

The seal member is manufactured by extruding an elongated, tubular structure having a corrugated circumferential surface, i.e., a circumferential surface that exhibits a plurality of alternating peaks and valleys extending longitudinally along the X-axis. The term tubular structure as used herein is meant to include a structure exhibiting annular, oval, elliptical, rectangular, square or any other shape along its longitudinal axis. After the tubular structure has been formed, it is crosslinked and then cut to form a seal member having a predetermined corrugated structure exhibiting a plurality of alternating peaks and valleys extending along and defining the inner and outer surfaces of the seal member in an axial direction.

The seals of the present invention are rigid, have stability over a wide temperature range and exhibit a low compression set resistance. Since it is the width of the seal member, not the circumference, which creates the seal, the seal member doe not require exact circumferential tolerances. In accordance with the invention, the present corrugated seal members not only have the ability to readily adjust to the shape of the seal-groove upon being disposed therein, but the corrugated configuration allows the seal member to exert resilient pressure at sequential points along both sides of the seal-groove providing a rigid and stable seal between the air intake manifold and the engine. Therefore, the need for expensive tooling and other costly manufacturing procedures associated with molded seal members can be eliminated. For example, the extruded seals of the present invention are free of excess flashing commonly associated with the manufacture of molded seals.

DETAILED DESCRIPTION OF THE INVENTION

Elastomeric seal members for use in automotive fuel systems to prevent the release of hydrocarbon fuel vapors into the atmosphere are generally made out of a fluoroelastomer material by a molding process which is expensive and requires time-consuming steps. The automotive seal members of the present invention are extruded multilayer seals which are not only superior to prior art seals, but are more economical to produce, are more rigid while still retaining sufficient resilience to provide excellent sealing characteristics. Furthermore, it is widely known that seal members are typically employed in a seal groove to secure the seal member in place. Prior to the present invention the only way that the seal member could be secured in the seal-groove was through modification of the seal-groove. This solution is unacceptable because of the high cost of such modifications. It has now been found that if the seal member is manufactured to have an irregular surface such as an alternating peak and valleys profile around the outer and inner surfaces of the seal member, exact tolerances of the width of the seal member is unnecessary because the peaks and valleys which make up the axial outer surface of the seals allow the seal to easily seat in the groove even if the seal member does not exactly meet the tolerances of the groove.

According to the invention, a first manifestation of the seal member comprises an extruded fluoroelastomer tubular seal member exhibiting a plurality of alternating peaks and valleys such that the seal has a corrugated shape. The seal also has a first tubular rim surface forming a first lateral side of the seal, a second tubular rim surface forming a second lateral side of the seal, wherein the first lateral side is diametrically opposite the second lateral side. In a second manifestation of the present invention, the seal member is an extruded multilayer seal member comprising a first inner fluoroelastomer and a second outer elastomer which is typically a non-fluoroelastomer disposed adjacent the first inner fluoroelastomer. Each of the first fluoroelastomer and the second elastomer exhibit a corrugated surface having alternating peaks and valleys in an axial relationship around the seal member. Typically, a fluoroelastomer material having a very low hydrocarbon fuel permeation rate forms the inner structural surface of the seal which is nearest to the hydrocarbon fuel of the automotive fuel system. The second elastomer is formed adjacent the inner fluoroelastomer material and exhibits improved physical characteristics.

Figure 1:
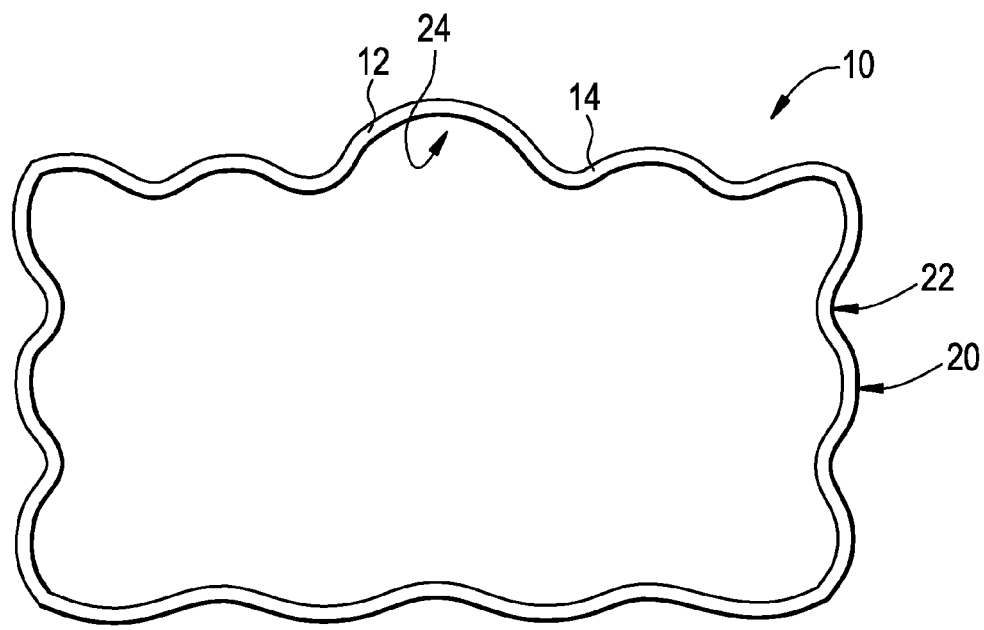
FIG. 1 is a cross sectional view of a single layer seal member of the present invention.
Figure 2:
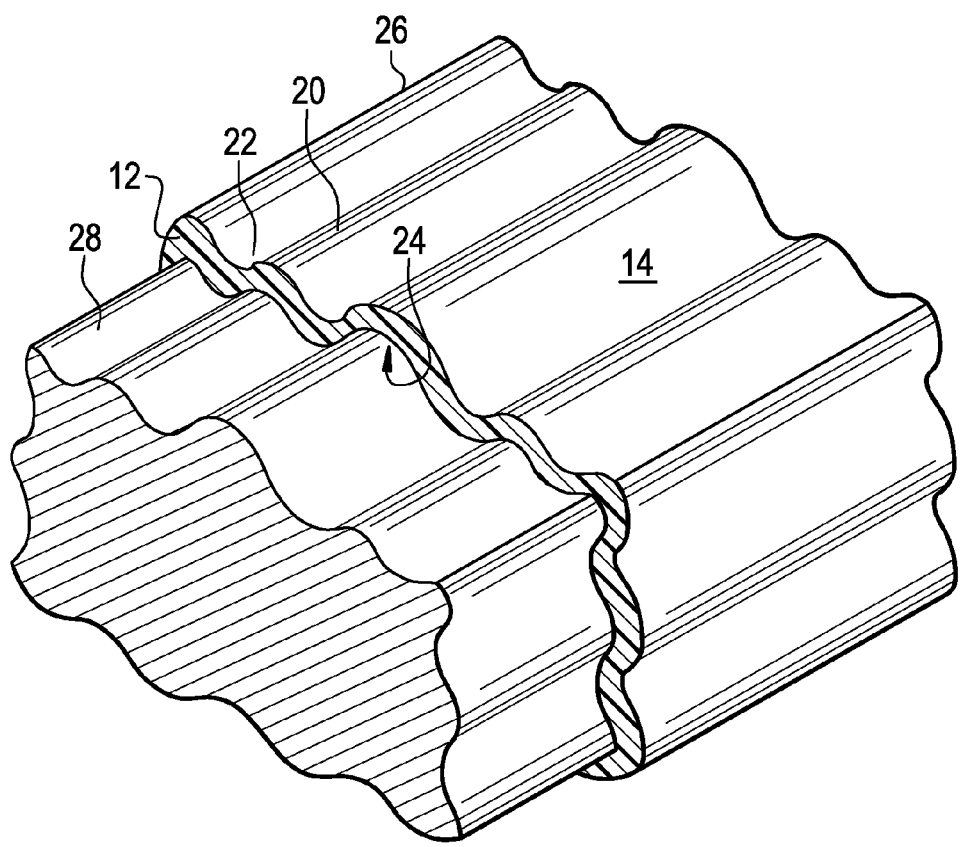
FIG. 2 is a fragmentary perspective view of a single layer tubular structure on a mandrel with portions of the single layer of the tubular structure broken for purposes of illustration.
Figure 3:
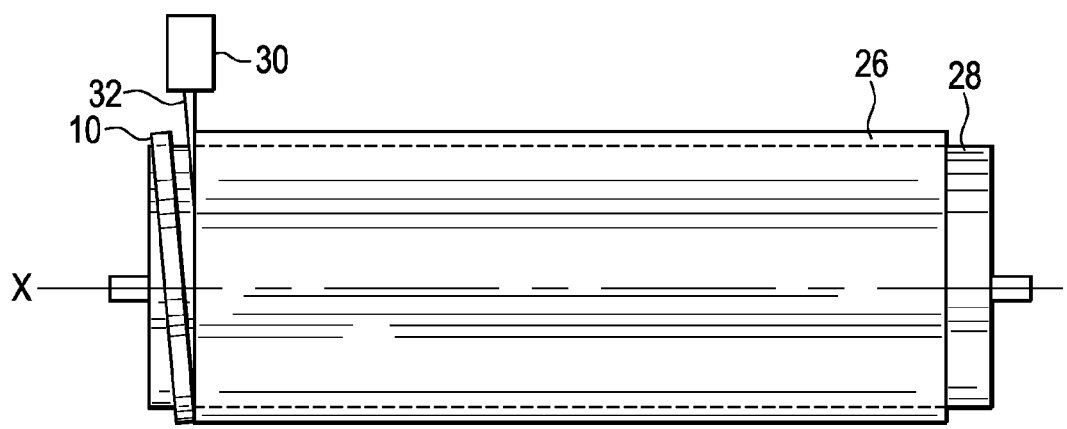
FIG. 3 is a plan view illustrating the formation of the seal member of FIG. 1 from the tubular structure of FIG. 2 using a lathe.

Referring to the drawings, FIGS. 1-3 are representative of one embodiment of the invention where a seal member 10 exhibits a generally rectangular configuration and exhibiting a corrugated profile having a plurality of alternating peaks 20 and valleys 22 in the axial direction. While the seal member 10 is shown as having a rectangular configuration, it may take any other desirable shape or configuration as described below. The seal member 10 comprises a fluoroelastomer material 12 forming a corrugated surface 14 of the seal member 10. The seal member 10, as shown in FIG. 1, exhibits an annular profile having a notch 24 which represents a deviation from the otherwise corrugated interior and exterior surfaces. The notch 24 may or may not be present in every seal member and may or may not take the shape illustrated in FIG. 1. It is to be understood that the notch 24 and its particular shape will be determined by the general shape of the fuel injector 42 (FIG. 7) in the fuel system component for accepting the seal 10, and may be different from that shown in FIG. 1.

FIG. 2 illustrates a tubular structure 26 from which the seal member 10 of FIG. 1 is formed, on a mandrel 28. A conventional extrusion process such as co-extrusion or tandem extrusion forms the tubular structure 26, from which the seal members 10 are fabricated. According to the invention, the extruded tubular structure 26 is placed on a mandrel 28 having the desired configuration for forming the corrugated seal member 10. The tubular structure 26 is crosslinked on the mandrel 28 to set the shape of the tubular structure 26 and the tubular structure 26 is then cut into a plurality of seal members 10 having the desired shape and width.

As illustrates in FIG. 3, a tubular structure 26 is cut into a plurality of seal members 10 using a lathe 30 having a blade 32 associated therewith. According to the invention, the extruded tubular structure 26 of FIG. 2 is placed on a mandrel 28 having the requisite configuration for forming the seal member 10. The tubular structure 26 is crosslinked on the mandrel 28 to set the shape of the tubular structure 26 and the tubular structure is then cut into a plurality of seal members 10 having the desired shape and dimensions. The tubular member 26 may be cut sequentially to form the seal members 10 one at a time using a single blade, or a plurality of the seal members may be formed simultaneously using a plurality of precisely spaced apart blades.

Figure 4:
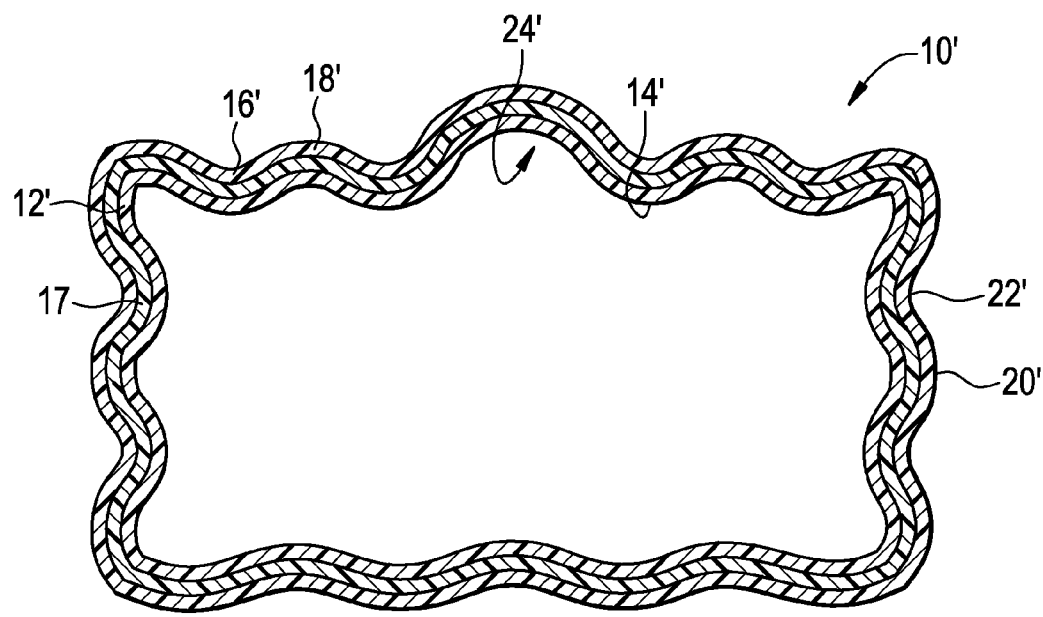
FIG. 4 is a cross sectional view of a multilayer layer seal member of the present invention.

FIG. 4 illustrates another embodiment of the invention where the seal member is a multilayer seal member where seal member 10' exhibits a generally rectangular configuration and exhibiting a corrugated profile having a plurality of alternating peaks 20' and valleys 22' in the axial direction. Again, while the seal member 10' is shown as having a rectangular configuration, it may take any other desirable shape or configuration. The seal member 10' comprises first elastomer material 12' forming an interior corrugated surface 14' of the seal member 10' and a second non-fluoroelastomer material 16' forming an exterior corrugated surface 18' of the seal member 10', and an optional intermediate layer 17' of a fluoroplastic material between the first fluoroelastomer layer 12' and the second non-fluoroelastomer layer 16'. The seal member 10', as shown in FIG. 4, exhibits an annular profile having a notch 24' which represents a deviation from the otherwise corrugated interior and exterior surfaces. The notch 24' may or may not be present in every seal member and may or may not take the shape illustrated in FIG. 4. It is to be understood that the notch 24' and its particular shape will be determined by the general shape of the fuel injector 42 (FIG. 7) in the fuel system component for accepting the seal 10', and may be different from that shown in FIG. 4.

Figure 5:
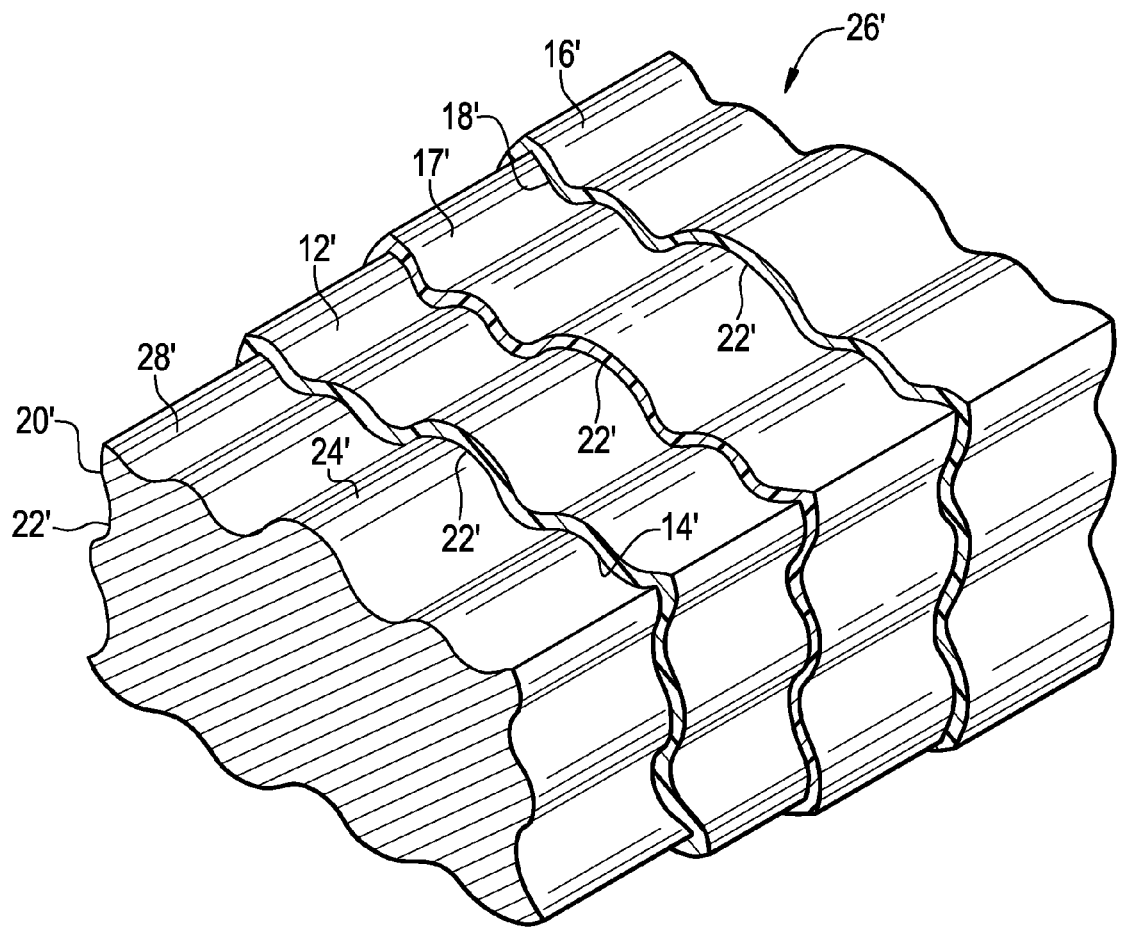
FIG. 5 is a fragmentary perspective view of a Multilayer layer tubular structure on a mandrel with portions of the various layers of the tubular structure broken for purposes of illustration.

FIG. 5 illustrates the formation of an extruded multilayer structure 26' having an inner fluoroelastomer layer 12', an outer elastomer layer 16' and an optional intermediate fluoroplastic barrier layer 17' is placed around a mandrel 28' having the desired corrugated configuration and the tubular structure 26' is then crosslinked to permanently establish the desired configuration.

The tubular structure 26' has a longitudinal axis X from which the multilayer seal member 10' of FIG. 4 is formed. A conventional extrusion process such as co-extrusion or tandem extrusion forms the tubular structure 26', from which the seal members 10' are fabricated. According to the invention, the extruded multilayer tubular structure 26' is placed on a mandrel 28' having the desired configuration for forming the corrugated seal member 10'. The tubular structure 26' is crosslinked on the mandrel 28' to set the shape of the tubular structure 26' and the tubular structure 26' is then cut into a plurality of seal members 10' having the desired shape and width.

Figure 6:
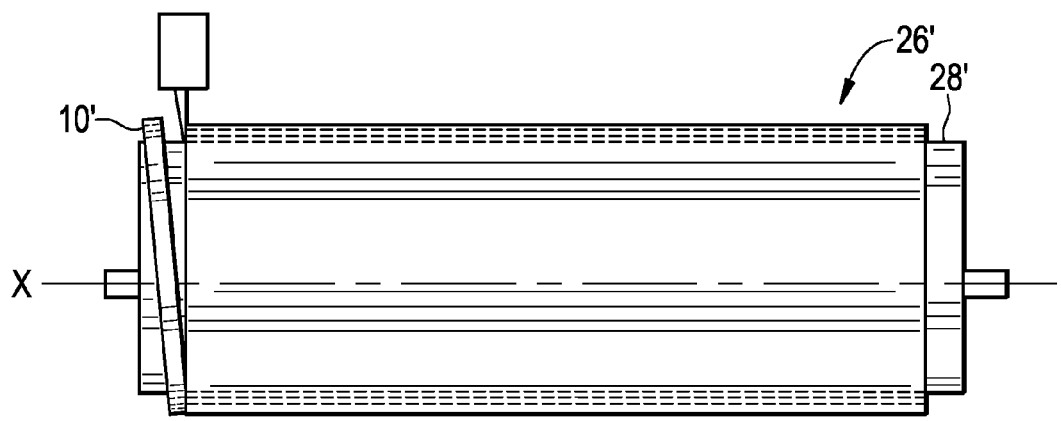
FIG. 6 is a plan view illustrating the formation of the seal member of FIG. 4 from the tubular structure of FIG. 5 using a lathe.

As illustrated in FIG. 6, a tubular structure 26' which includes a barrier layer 17' between the fluoroelastomer layer 12' and the non-fluoroelastomer layer 16' is cut to provide a single member 10' using a lathe 20'. The tubular structure 26' having a longitudinal axis X from which the seal member 10' of FIG. 2 is formed by conventional extrusion such as co-extrusion or tandem extrusion. According to the invention, the extruded multilayer tubular structure 26' of FIG. 5 is placed on a mandrel having the requisite configuration for forming the seal member 10'. The tubular structure 26' is crosslinked on the mandrel 28' to set the shape of the tubular structure 26' and the tubular structure is then cut into a plurality of seal members 10' having the desired shape and width. The tubular member 26' may be cut sequentially to form the seal members one at a time (FIG. 6) using a single blade, or a plurality of the seal members may be formed simultaneously using a plurality of precisely spaced apart blades.

The extruded multilayer tubular structure 26' having an inner fluoroelastomer layer 12', an outer elatomer layer 16' and an optional intermediate fluoroplastic barrier layer 17' is placed around a mandrel 28' having the desired corrugated configuration and the tubular structure 26' is then crosslinked to permanently establish the desired configuration.

Figure 7:
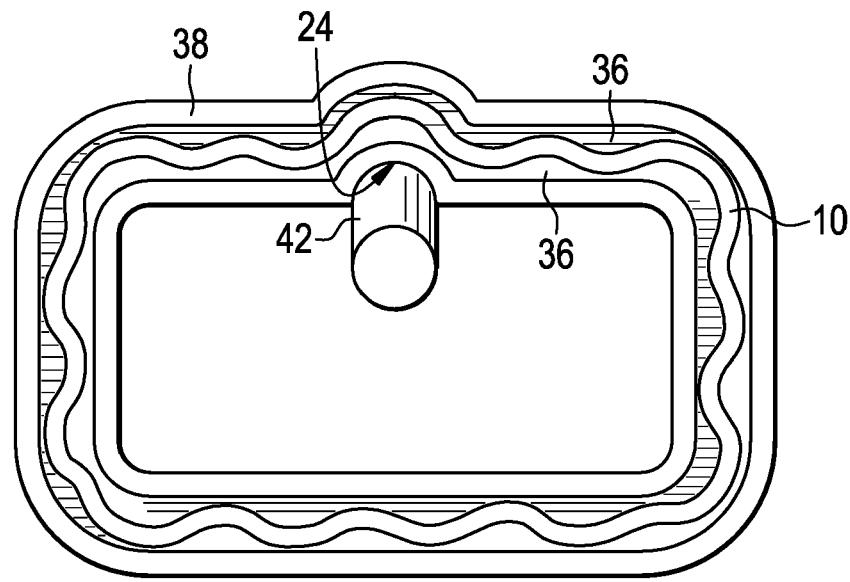
FIG. 7 is a cross-sectional plan view of a typical air intake manifold port having a seal member of the present invention disposed therein.

FIG. 7 shows the seal member 10 in a seal groove 36 wherein said seal member 10 is positioned in the groove 36 for sealing an air intake manifold 38 to an automotive engine 40. The seal member 10 includes a notch 24 having a general shape corresponding to a fuel injector 42.

The individual layers of the extruded multilayer tubular structure and the seal members manufactured there from include at least one fluoropolymer material and at least one non-fluoropolymer material. Preferably, the first polymer layer is an FKM fluoropolymer and the second polymer layer, or outer layer, is a non-fluoropolymer.

Figure 8:
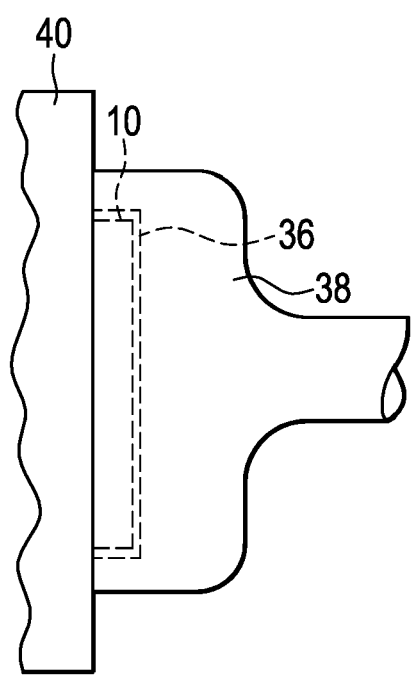
FIG. 8. illustrates an automotive air intake manifold sealed to an automotive engine using a seal member of the present invention disposed therein.

FIG. 8 illustrates an automotive air intake manifold 38 sealed to an automotive engine 40 wherein the seal member 10 is disposed in the air intake manifold groove 36.

The polymeric material, that forms the extruded tubular structure and, ultimately, the seal member, is a fluoroelastomer such as an FKM fluoroelastomer. FKM fluoropolymers are commonly referred to as fluoroelastomers or fluoro rubbers of the polymethylene type that utilizes vinylidene fluoride as a co-monomer and has substituent fluoro, alkyl, perfluoroalkyl or perfluroalkoxy groups on the polymer chain with or without a cure site monomer (having a reactive cure site). Generally, FKM fluoropolymers include dipolymers of hexafluoropropylene and vinylidene fluoride; terpolymers of tetrafluoroethylene, vinylidene fluoride and hexafluoropropylene; terpolymers of tetrafluoroethylene, fluorinated vinyl ether and vinylidene fluoride; terpolymers of tetrafluoroethylene, propylene and vinylidene fluoride; and pentafluoropolymers of tetrafluoroethylene, hexafluoropropylene, vinylidene fluoride, ethylene, and a fluorinated vinyl ether. Preferably, the FKM fluoropolymers of the present invention are fluoroelastomers selected from the group consisting of a polyvinylidene tetrafluoride, polyvinylidene trifluoride, polyvinylidene difluoride, polyvinyl Amendments to the Drawings are shown at page 7 of this paper.

In some instances, it may be desirable to use certain fluoroelastomers which have an affinity for hydrocarbons, such as fluorosilicone elastomer, as an inner material covered with a second fluoroelstomer material to provide the first fluoroelastomer layer of the seal member, and a non-fluoroelastomer as the outer layer of the seal member, whereby the fluorosilicone material would adsorb the hydrocarbons which would then be purged from the fluorosilicone when the engine is running.

The non-fluoropolymer material which forms the outer surface of the extruded tubular structure and, ultimately, the seal member is an elastomer selected from the group consisting of an ethylene-acrylic copolymer (AEM), a polyacrylate (ACM), an ethylene-vinyl acetate rubber (EVM), a nitrile-butadiene rubber (NBR), a hydrogenated nitrile-butadiene rubber (HNBR), an ethylene-propylene-diene terpolymer (EPDM), a polybutadiene, a polyisoprene, a silicone rubber, and the like, and blends thereof. Preferably, the second elastomer that forms the outer layer of the seal member is an ethylene-acrylic copolymer.

An optional barrier layer may be employed between the first FKM fluoroelastomer layer and the second elastomer layer to prevent or significantly reduce the permeation of hydrocarbon fuel vapors to the atmosphere. Typically, the intermediate barrier layer is a thin layer of a fluoroplastic material such as tetrafluoroethylene-hexafluoropropylene-vinylidene fluoride terpolymer (THV), polyvinylidene fluoride, ethylene-fluoroethylene-propylene (EFEP), fluoroethylene-propylene (EFP), ethylene-tetrafluoroethylene (ETFE), and the like. Preferably, the intermediate barrier layer is a tetrafluoroethylene-hexafluoropropylene-vinylidene fluoride terpolymer (THV).

It may be desirable, in some instances, to further enhance the adherence of the first FKM fluoroelastomer layer to the THV fluoroplastic intermediate barrier layer, and/or between the THV fluoroplastic barrier layer and the second non-fluoroelaxtomer layer by applying a suitable adhesive between such layers. The adhesive may be any of those adhesives conventionally used to adhere such polymeric structures together. Typically, the adhesive is an amine-based adhesive.

The thicknesses of the various layers of the seal member depend upon the extrusion process and are not considered to be absolutely critical to the effectiveness of the seal. However, the first polymer layer which preferably is a fluoroelastomer forming the inner layer of the tubular structure, typically has a thickness of about 0.1 to 5 mm and, preferably about 0.2 to 2 mm; and the second polymer layer which, preferably is an elastomer forming the outer layer of the tubular structure, typically has a thickness of about 0.1 to 5 mm and, preferably, about 0.2 to 2 mm.

The width of the seal member which is responsible for the effectiveness of the seal is predetermined and depends upon the particular use of the seal member. The width of the seal member is measured from the outer rim surface of one lateral side of the seal member to the outer rim surface of the other lateral side of the seal member. To be effective, the seal member has a width which is greater than the depth of the seal groove. Typically, the width of the seal member ranges from about 1 to 30 mm and, preferably about 3 to 20 mm.

According to a preferred method for the manufacture of the seal members of the invention, a multilayer tubular structure having an irregular surface is first extruded to form a multilayer tubular structure having the desired irregular surface, crosslinked, and then cut into individual seal members wherein each of the seal members exhibit an inner surface and an outer surface configuration having a plurality of alternating peaks and valleys in the axial direction.

After the multilayer tubular structure is formed, the structure is crosslinked in the presence of a peroxide, a polyol, a dihydroxy, a bisphenol, a polyamine, and the like, or a mixture thereof. Preferably, the crosslinking agent is a peroxide selected from the group consisting of dicumyl peroxide, 2,5-dimethyl-2,5(t-butylperoxy)-hexene-3; 2,5-dimethyl-2,5-di(t-butylperoxy)-hexane, 1,1-bis(t-butylperoxy)-hexene-3, t-butylperoxybenzoate, dibenzoyl peroxide; t-butylperbenzoate; and mixtures thereof. In some instances it may be desirable to use a co-agent in combination with the peroxide crosslinking agent. Suitable co-agents include triallyl cyanurate, triallyl isocyanate, tri-methallyl-isocyanate, tris (diallylamine-s-triazine, triallyl) phosphate, and the like and mixtures thereof.

Upon being crosslinked, the multilayer tubular structure is uniformly cut into a plurality of predetermined seal members as described above wherein each of the seal members exhibit an inner surface and an outer surface having a plurality of alternating peaks and valleys, configurations, and recovered for use in various applications requiring little or no hydrocarbon fuel vapor permeation. The seal members of the present invention having stability at wide temperature ranges and low compression set resistance are useful in the automotive industry, particularly in automotive fuel systems where reliability and reduced hydrocarbon fuel vapor permeation are desired. A preferred application for the seal members of the invention is in an automotive fuel system wherein the seal is disposed between the air intake manifold and the automotive engine.

Various pigments and/or other colorants as well as other conventional additives may be added to the first fluoroelastomer material and/or to the second elastomer material to meet certain desirable specifications. For example, one of the elastomer layers may be colored a particular color and the other elastomer layer colored a different color. Typically, the outer elastomer layer is black and the inner fluoroelastomer layer is of a color other than black.

While the present invention has been fully described and illustrated herein, it is to be understood that certain variations, changes and modifications may be made to the invention without departing from the spirit and scope of the invention as defined by the appended claims.

What is claimed is:

1. An automotive fuel system seal member for sealing an air intake manifold to an automotive engine, said automotive fuel system seal member comprising at least one annular layer of a fluoroelastomer material, said annular layer of fluoroelastomer material comprising:
   an outer corrugated annular surface exhibiting a plurality of longitudinal peaks and valleys;
   an inner corrugated annular surface parallel to said outer corrugated annular surface, said inner corrugated annular surface exhibiting a corresponding corrugated surface having a corresponding plurality of parallel peaks and valleys, wherein the distance between said outer corrugated annular surface and said inner corrugated annular surface defines the thickness of said at least one annular layer of fluoroelastomer material;
   a first circumferential rim surface forming a first lateral side surface perpendicular to said outer corrugated annular surface and to said inner corrugated annular surface; and
   a second circumferential rim surface forming a second lateral side surface parallel to said first lateral side surface, wherein the distance between said first lateral side surface and said second lateral side surface defines the width of said seal member, said seal member providing improved permeation resistance to hydrocarbon fuel vapors when used to seal a first fuel system component to a second fuel system component.

2. The seal member of claim 1 wherein said fluoroelastomer material is selected from the group consisting of polyvinylidene tetrafluoride, polyvinylidene trifluoride, polyvinylidene difluoride, polyvinyl fluoride, polyvinylidene fluoride, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, and blends thereof.

3. The seal member of claim 2, wherein said fluoroelastomer material is hexafluoropropylene-difluoroethylene copolymer.

4. The seal member of claim 1, wherein said seal member has a width of about 1.0 to 20 mm.

5. The seal member of claim 4, wherein said seal member has a width of about 3.0 to 10 mm.

6. The seal member of claim 1, wherein said at least one annular layer of fluoroelastomer material has a thickness of about 0.1 to 5 mm.

7. The seal member of claim 1 wherein said fluoroelastomer material is crosslinked.

8. The seal member of claim 1 wherein said automotive fuel system seal member further comprises a non-fluoroelastomer material around said fluoroelastomer material, said non-fluoroelastomer material having first and second corrugated surfaces corresponding to the corrugated surfaces of said fluoroelastomer material.

9. The seal member of claim 8 wherein said fluoroelastomer is selected from the group consisting of ethylene-acrylic copolymer, polyacrylate, ethylene-vinyl acetate rubber, nitrile-butadiene rubber, hydrogenated nitrile-butadiene rubber, ethylene-propylene-diene terpolymer, polybutadiene, polyisoprene, silicone rubber, and blends thereof, said first fluoroelastomer layer and said second elastomer layer forming a pair of opposed substantially parallel rim surfaces perpendicular to said first circumferential layer of fluoroelastomer material and to said second circumferential layer of said non-fluoroelastomer material.

10. The seal member of claim 9, wherein said non-fluoroelastomer is an ethylene-acrylic copolymer.

11. The seal member of claim 9 further comprising a barrier layer disposed between said fluoroelastomer material and said non-fluoroelastomer material, wherein said barrier layer is a fluoroplastic material selected from the group consisting of tetrafluoroethylene-hexafluoropropylene-vinylidene fluoride (THY), polyvinylidene fluoride (PVDF), ethylene-fluoroethylene-propylene (EFEP), fluoroethylene-propylene (EFP), ethylene-tetrafluoroethylene (ETFE), and blends thereof.

12. The seal member of claim 11, wherein said barrier layer is a tetrafluoroethylene-hexafluoropropylene-vinylidene fluoride terpolymer.

13. The seal member of claim 11, further including an adhesive layer between said fluoroelastomer layer and said fluoroplastic barrier layer, and between said fluoroplastic barrier layer and said non-fluoroelastomer layer.

14. The seal member of claim 13, wherein said adhesive layer is an amine-based adhesive.

15. The seal member of claim 1, wherein said seal member includes a notch therein for accommodating a fuel injector.

16. In an automotive fuel system wherein a automotive air intake manifold is sealed to an automotive engine employing an automotive fuel system seal member disposed between said automotive air intake manifold and said automotive engine, the improvement which comprises employing as the automotive fuel system seal member, a crosslinked, extruded, automotive, fuel system seal member comprising at least one annular layer of a fluoroelastomer material selected from the group consisting of polyvinylidene tetrafluoride, polyvinylidene trifluoride, polyvinylidene difluoride, polyvinyl fluoride, polyvinylidene fluoride, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, and blends thereof, said at least one annular layer of fluoroelastomer material comprising:

an outer corrugated annular surface exhibiting a plurality of longitudinal peaks and valleys; an inner corrugated annular surface parallel to said outer corrugated annular surface, said inner corrugated annular surface exhibiting a corresponding corrugated surface having a corresponding plurality of parallel peaks and valleys, wherein the distance between said outer corrugated annular surface and said inner corrugated annular surface defines the thickness of said at least one annular layer of fluoroelastomer material; a first circumferential rim surface forming a first lateral side surface perpendicular to said outer corrugated annular surface and to said inner corrugated annular surface; and a second circumferential rim surface forming a second lateral side surface parallel to said first lateral side surface, wherein the distance between said first lateral side surface and said second lateral side surface defines the width of said seal member, said seal member providing improved permeation resistance to hydrocarbon fuel vapors having a corrugated annular surface profile which exhibits a plurality of longitudinal peaks and valleys wherein said seal member provides improved rigidity and resilience while reducing hydrocarbon permeation to the atmosphere without requiring an exact fit of said seal member in the seal-groove.

17. The method of claim 16 wherein said first fluoroelastomer is a hexafluoropropylene-difluoroethylene copolymer.

18. The method of claim 16 wherein said automotive fuel system seal member further includes an annular layer of a non-fluoroelastomer material around said annular fluoroelastomer layer, said non-fluoroelastomer material having an inner surface and an outer surface, said inner surface and said outer surface exhibiting a corrugated surface having a plurality of longitudinal, parallel peaks and valleys thereon, said plurality of parallel peaks and valleys corresponding to the plurality of parallel peaks and valleys on said fluoroelastomer layer wherein said non-fluoroelastomer material is selected from the group consisting of ethylene-acrylic copolymer, polyacrylate, ethylene-vinyl acetate rubber, nitrile-butadiene rubber, hydrogenated nitrile-butadiene rubber, ethylene-propylene-diene terpolymer, polybutadiene, polyisoprene, silicone rubber, and blends thereof, said automotive fuel system seal member including a first rim surface for contacting an automotive air intake manifold and a second rim surface for contacting an automotive engine, wherein said first rim surface is substantially parallel to said second rim surface, wherein said seal member exhibits improved rigidity and resilience while preventing or significantly reducing hydrocarbon permeation to the atmosphere.

19. The improvement of claim 18, wherein said automotive fuel system seal member further comprises a fluoroplastic barrier layer between said-fluoroelastomer layer and said second non-fluoroelastomer layer, said fluoroplastic barrier layer being formed from a fluoroplastic material selected from the group consisting of tetrafluoroethylene-hexafluoropropylene-vinylidene fluoride {THY), polyvinylidene fluoride, ethylene-fluoroethylene-propylene (EFEP), fluoroethylene-propylene (EFP), ethylene-tetrafluoroethylene (ETFE), and blends thereof.

20. The improvement of claim 19, wherein said barrier layer is a tetrafluoroethylene-hexafluoropropylene-vinylidene fluoride terpolymer.

21. The improvement of claim 16, wherein said non-fluoroelastomer is an ethylene-acrylic copolymer.

22. The improvement of claim 16, wherein said automotive fuel system seal member further includes an amine-based adhesive between said fluoroelastomer layer and said fluoroplastic barrier layer, and between said fluoroplastic barrier layer and said non-fluoroelastomer layer.

* * * * *